April 19, 1966 K. M. OGILVIE 3,246,572
FLUID CONTROL APPARATUS
Filed Nov. 23, 1964 2 Sheets-Sheet 1

INVENTOR.
KENNETH M. OGILVIE
BY HIS ATTORNEYS
HARRIS, KIECH, RUSSELL & KERN

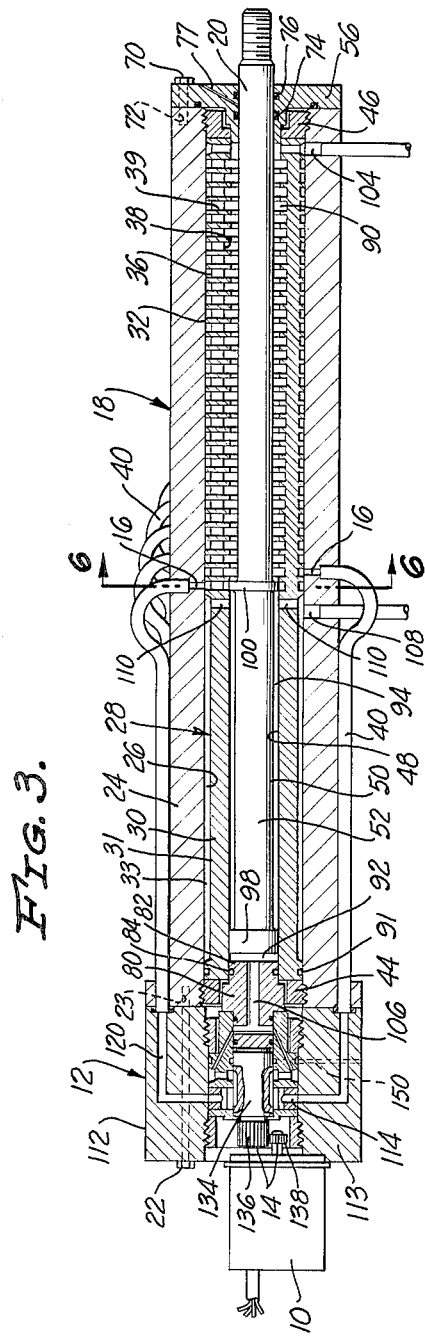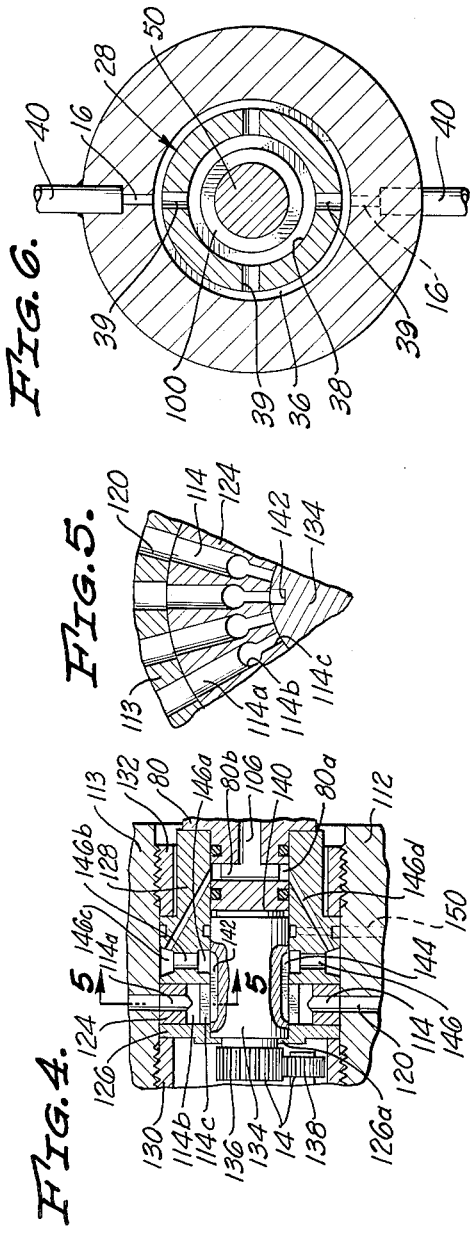
INVENTOR.
KENNETH M. OGILVIE
BY HIS ATTORNEYS
HARRIS, KIECH, RUSSELL & KERN

United States Patent Office 3,246,572
Patented Apr. 19, 1966

3,246,572
FLUID CONTROL APPARATUS
Kenneth M. Ogilvie, Pasadena, Calif., assignor to Bertea Products, Pasadena, Calif., a corporation of California
Filed Nov. 23, 1964, Ser. No. 413,196
14 Claims. (Cl. 91—48)

This invention relates to fluid control apparatus and more particularly to a fluid actuated servo valve, a hydraulic encoder rotary valve, and a hydraulic system adapted to provide digital mechanical positioning from electrical digital information.

Various automatically controlled devices employ electrical digital information for positioning a component of the system, the digital positioning being commonly done electrically. Such a system involves the use of electrical feedbacks which are not wholly reliable because of cumulative drifting in the valves, amplifiers, and other units.

It is a principal object of this invention to provide a mechanical servo analog in place of the more commonly used electrical system to provide digital mechanical positioning from electrical digital information.

It is a further object of the invention to provide a fluid actuated servo valve of unusual and novel structure, particularly suitable for use in digital mechanical positioning from electrical digital information.

It is a still further object of the invention to provide a rotary hydraulic switch or encoder especially designed for use with an incremental stepping device and which may be used in combination with the fluid actuated servo valve of the invention.

It is another object of the invention to provide an overall system to provide linear digital mechanical positioning from electrical digital information which may be used with various automated devices.

It is a still further object of the invention to provide a digital mechanical positioning system employing electrical digital information which is especially suitable for use in positioning a magnetic pickup in a computer memory system.

It is another object of the invention to provide a digital mechanical positioning system employing electrical digital information, which system is characterized by simple construction and a minimum of maintenance.

It is a further object of the invention to provide a digital mechanical positioning system employing incremental stepping units, which system is characterized by long life without significant shift in step locations or deterioration of stepping accuracy.

It is another object of the invention to provide a digital mechanical positioning system using electrical digital information which system produces smooth accurate locating with no parts striking other parts.

The digital mechanical positioning system of the invention has very high inherent accuracy and stability attributable to the feedback being purely mechanical in contrast to the electrical feedback systems heretofore commonly proposed. The positioning system of the invention utilizes an incremental stepping device, typically an electrical stepping motor, which is connected to a hydraulic encoder or selector valve which is used to govern a servo valve, imparting incremental movement to an actuating rod thereof which, in turn, provides the digital mechanical positioning desired.

The fluid actuated or circuit seeking servo valve of the invention comprises a valve body including a row of closely spaced actuator ports opening through the wall of the valve body into the interior thereof. A movable control member is slidably disposed in the valve body and includes an actuating rod projecting through an end thereof. The movable control member divides the interior of the valve body into a pressure section or chamber of a variable length, an actuating section also of a variable length, and an exhaust section disposed therebetween. The control member includes an actuating control land which provides a barrier between the exhaust and pressure sections of the valve body, which land is movable along the length of the row of the closely spaced actuator ports. Movement of the control land serves to expose various ones of the closely spaced actuator ports to the respective pressure and exhaust sections of the valve body. The control member also supports a second barrier or piston which separates the actuating section from the intermediately disposed exhaust section of the valve body. A pressure supply port and an exhaust port, located in the valve body, open respectively into the pressure section and the exhaust section. A hydraulic or supply port is also located in the valve body and opens into the foregoing actuating section.

More precisely speaking, in the embodiment illustrated the exhaust port, which is located between the actuating control land and the second barrier, both of which may be viewed as pistons, is located throughout the length of travel of the control member at all times between the two pistons. The pressure port is located in the valve body between the foregoing row of closely spaced actuator ports and one end of the valve body and, similarly, the hydraulic supply port is located in the valve body between one of the pistons and the other end of the valve body.

Controlled movement of the hydraulic servo valve is obtained by providing a means for selectively connecting one of the closely spaced actuator ports in the wall of the valve body to the hydraulic supply port and the actuating section located at the other end of the valve body. In the embodiment illustrated, the selective means takes the form of a hydraulic encoder or rotary valve having a stator member provided with a plurality of circumferentially arranged rotary valve ports which are connected by a plurality of fluid passage means to the respective closely spaced actuator ports of the servo valve body. The stator member also includes an outlet passage which communicates through a connecting means to the hydraulic supply port and actuating section of the servo valve body. The hydraulic encoder includes a rotor member having a fluid passage, the rotor member being rotatable in both clockwise and counterclockwise directions for connecting various ones of the rotary valve ports of the stator through the passage of the rotor to the foregoing connecting means to the hydraulic supply port of the servo valve body.

Other objects and advantages of the invention will become more apparent from a study of the following specification and the accompanying drawings in which:

FIG. 3 is a longitudinal sectional view through an integral unit comprising a stepper motor at the far left of the figure and a circuit seeking servo at the right side of the figure with a hydraulic encoder therebetween;

FIG. 4 is a fragmentary, enlarged, longitudinal sectional view of the hydraulic encoder portion of the unit of FIG. 3;

FIG. 5 is an enlarged, fragmentary, cross-sectional view taken along line 5—5 of FIG. 4; and FIG. 6 is an enlarged cross-sectional view taken along line 6—6 of FIG. 3 illustrating a central portion of the circuit seeking servo of the unit of FIG. 3.

General description

Figure 1:
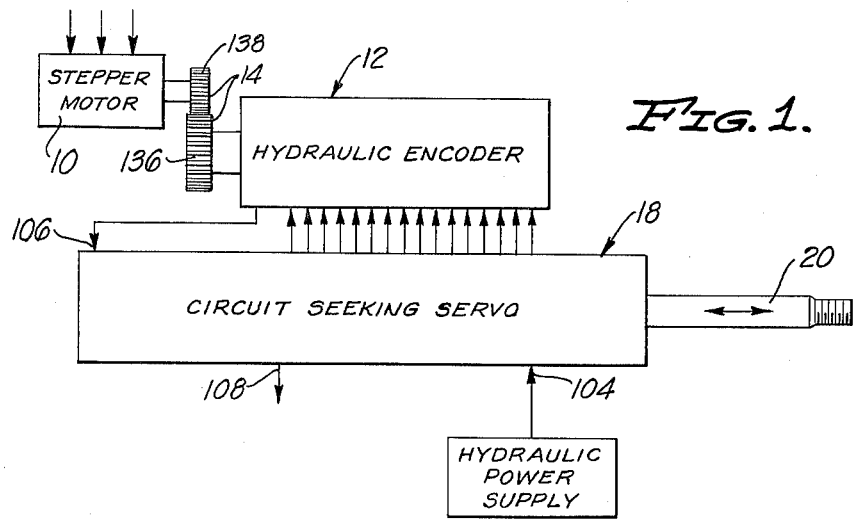
FIG. 1 is a schematic flow diagram of a preferred embodiment of the hydraulic control system of the invention including a stepper motor, a hydraulic encoder, a circuit seeking servo, and a hydraulic power supply.

Referring to FIG. 1, there is illustrated an electrical stepper motor 10 having three windings and, in the particular embodiment illustrated, a discrete stepping time of .0015 second. The particular system illustrated is especially suitable for use in positioning the magnetic pickup in a computer memory system. The motor is capable of 660 p.p.s. synchronous operation but is used at 250 p.p.s. to give an ample force margin. A train of signals is fed to a controller (not a part of the invention and of conventional design) which, in turn, drives the three-phase stepping motor 10. The stepper motor 10, which moves in 15 degree steps, is geared down to 2:1 and drives a hydraulic encoder or selector valve 12 through a gear train 14 in 7½ degree steps. The hydraulic encoder 12 selects, in sequence, actuator ports 16 of the servo valve (circuit seeking servo) and the servo valve moves to the selected port, thus providing digital mechanical positioning of an actuator rod 20 and the mechanism connected thereto.

Circuit seeking servo

The circuit seeking servo or fluid actuated servo valve 18 of the integral unit (FIG. 3) is held to the hydraulic encoder 12 (a rotary selector valve in the embodiment illustrated) by several bolts 22 whose internal ends are threadedly held in holes 23 located in the left end of a tubular valve body 24 of the servo valve. Bore 26 of the tubular valve body 24 houses an elongated integral sleeve 28, which as viewed in the left of FIG. 3, has a first portion 30, which for a greater portion of its length has its outer wall 31 spaced from the bore 26 defining an elongated annular space 33. The other end (right end in FIG. 3) or second portion 32 of the sleeve 28 is provided with a series or row of aligned outer and inner circular grooves 36 and 38 located, respectively on the outer face of the sleeve and its bore. The aligned pairs of outer and inner grooves 36 and 38 of the sleeve 28 are connected by four equally spaced, circumferentially located passages 39 (see FIGS. 3 and 6).

The valve body 24 is provided, as mentioned before, with a row of closely spaced actuator ports 16, spirally located in the valve body. Each of the several actuator ports 16 opens into a respective one of the previously described outer grooves 36 of the sleeve 28. The outer ends of the respective several actuator ports 16 of the valve body 24 are counterbored to provide enlarged holes to receive and securely hold a series of fluid lines 40, which lines 40 connect to the encoder 12. The sleeve 28 is positioned within the valve body by retainer rings 44 and 46, respectively, which engage internal threads located at the opposite ends of the valve body 24.

The valve body 24 and, more precisely speaking, a bore 48 of the sleeve 28 slidably support a movable control member 50 which includes an actuating rod 52 that projects through an end of the valve body and is journaled in a bore of an end enclosure plate 56 which is held to the right-hand end (FIG. 3) of the valve body by several bolts 70 engaging internally threaded holes 72.

A pair of O-rings 74 and 76 is seated in recesses of the bore of the end enclosure plate 56 and engages the actuating rod 52. In the particular embodiment illustrated, there is provided an oil seepage passage 77 between the two O-rings 74 and 76.

The opposite end of the circuit seeking servo 18 adjoining the hydraulic encoder 12 is closed by a generally T-shaped end member 80 which has a cylindrical protrusion 82 which extends into the bore 48 of the sleeve 28, there being provided an O-ring seal 84 between the protrusion and the bore to minimize fluid loss. It will also be seen that the left-hand end (FIG. 3) of the sleeve 28 is flared outwardly to provide a sealing surface for engagement with the bore 26 of the valve body 24, there again being provided an O-ring seal 91 between the two members.

Figure 2:
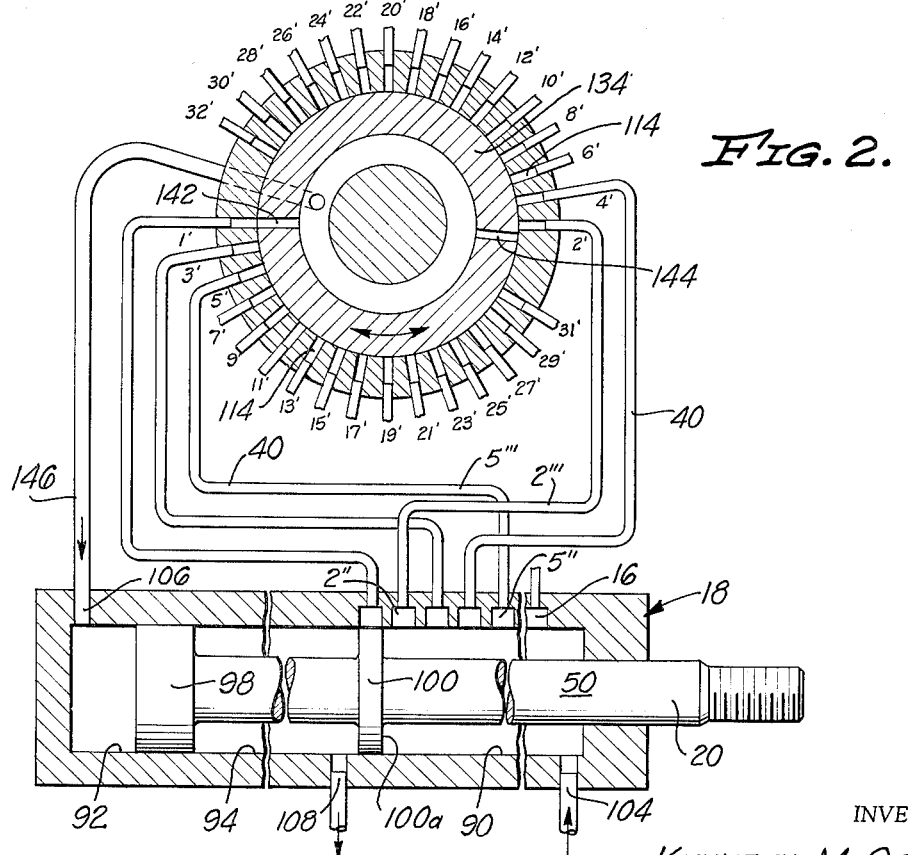
FIG. 2 is a schematic representation of the hydraulic encoder and circuit seeking servo of the system of FIG. 1.

Reference to FIGS. 2 and 3 will show that the movable control member 50 divides the interior of the valve body 24, more precisely speaking the interior of the sleeve 28, into a pressure section or chamber 90 of variable length at one end thereof and into an actuating section or chamber 92 again of variable length at the other end of the valve body, with an exhaust section or chamber 94 of constant length therebetween. The movable control member 50, or more exactly speaking the actuating rod 20, supports a first piston 98 at the end of the rod within the valve body at the left of FIG. 3. This first piston 98 and the protrusion 82 of the end member 80 define the variable size actuating chamber 92. In FIG. 3 the device is shown in its fully retracted position. A second piston 100 is spaced away from the first piston 98 and is located more or less centrally of the length of the actuating rod 20. The first and second pistons 98 and 100, respectively, therebetween define the exhaust chamber 94. With movement of the actuating rod 52, the second piston 100 serves as an actuator control land for the opening and closing of the several actuator ports 16, exposing the various ports 16 to either the pressure section 90 or the exhaust section 94 of the servo valve.

A pressure supply port 104 connected to a hydraulic power supply opens into the pressure section 90 between the row of closely spaced actuator ports 16 and the enclosure plate 56 at the right end (FIG. 3) of the servo valve. A fluid supply port 106 located in the valve body 24 and, more precisely, the end member 80 (at the left end of the servo valve as seen in FIG. 3) opens into the actuating section 92. An exhaust port 108, also located in the valve body 24, opens laterally therethrough into the exhaust section or chamber 94. Reference to FIG. 3 will show that the exhaust port 108, more exactly speaking, connects with the elongated annular space 33 between the sleeve 28 and the bore 26 of the valve body 24 and the annular space 33, in turn, is connected through a plurality of passages 110 into the interior of the sleeve 28.

Hydraulic encoder

The hydraulic encoder 12, which, in the embodiment illustrated, takes the form of a rotary selector valve, may be viewed as a means for selectively connecting one of the closely spaced actuator ports 16 of the servo valve member 18 to the fluid supply port 106 and through that port to the interior of the actuating section or chamber 92. As earlier mentioned, the hydraulic encoder 12 is driven by an incremental stepping device, e.g., the stepper motor 10.

The hydraulic encoder or rotary valve 12 has a stator member 112 which is provided with a plurality of circumferentially arranged valve ports 114 which are connected by a like plurality of the earlier mentioned fluid lines 40 to the respective ones of the actuator ports 16 of the circuit seeking servo 18.

The stator member 112 is made up of several components including a tubular housing 113 having a relatively thick wall through which passages 120 connect the several external fluid lines 40 from the servo valve 18 to the aforementioned circumferentially arranged valve ports 114. In addition, the stator member 112 of the hydraulic encoder includes a relatively thin annular disc 124 (see enlarged fragmentary views of FIGS. 4 and 5) which houses the several radially extending, circumferentially arranged ports 114. For ease of manufacture and because of the limitations imposed by the small dimensions involved, each of the ports 114 comprises a perpendicularly drilled hole 114a extending radially of the disc from the circumference thereof and a transverse drilled hole 114b, which latter hole opens into a transverse milled slot 114c formed in the inner face of the disc, all of which will be best understood with reference to FIGS. 4 and 5. The foregoing disc 124 and its peculiar structure is a special feature of the rotary valve of the invention.

The annular disc member 124 of the stator member 112 is held between a lock ring 126 and a spool member 128 which latter two members are held in position by retaining rings 130 and 132 which threadedly engage the inner surface of the thick-walled tubular housing 113 of the stator member.

The hydraulic encoder 12 has a rotor 134 which is rotatably supported within the cylindrical holes of the annular disc member 124 and the spool member 128. The rotor at its outer end has integrally formed therewith a driven gear 136 which meshes with a smaller, driver gear 138 of the motor 10. The two gears 136 and 138 comprise the aforementioned gear train 14. The rotor 134 at its inner end has an integral step-down protrusion 140 which slidably abuts against one end of the servo valve end member 80. As best seen in FIG. 4, the rotor 134 is held within the hydraulic encoder 12 by a downwardly extending circular flange 126a which is an integral part of the lock ring 126. The lock ring flange 126a slidably engages a radially extending ledge of the rotor 134.

In the particular embodiment illustrated, the rotor 134 is provided with nearly diametrically opposed longitudinally extending fluid slots 142 and 144 in its outer cylindrical surface. The fluid slots 142 and 144 at their outer ends are, with movement of the rotor 134, brought separately into alignment with various ones of the several circumferentially arranged ports 114 of the annular disc member 124 of the larger stator member 112. The opposite or inner ends of the two fluid slots 142 and 144 connect into an irregular passage 146 of the spool (see FIG. 4) which eventually opens into the fluid supply port 106 of the actuating chamber 92. A closer examination of FIG. 4 will show that the irregular passage 146 includes a circular groove 146a on the inner circumferential surface of the spool member 128 with the circular groove 146a immediately adjoining the rotor and communicating with the fluid slots 142 and 144 of the rotor 134. The inner circular groove 146a connects radially extending fluid passages 146b to an outer circumferential groove 146c located on the outer cylindrical surface of the spool member 128. From the latter groove 146c, the irregular passage 146 includes sloping passages 146d opening into a circular groove 80a of the servo valve end member 80. The groove 80a is connected by radially extending passages 80b to the outer end of the fluid supply port 106. The hydraulic encoder 12 is provided with an oil seepage passage 150 which at its inner end adjoins the rotor 134 and extends radially outwardly therefrom through the spool member 128 and stator housing 113.

Operation

The operation of the fluid control system of the invention and its individual components is best understood with reference to the schematic representations of FIGS. 1 and 2. The circuit seeking servo 18 is of a type classified as an unbalanced area actuator in which full system pressure is supplied from a hydraulic power supply via port 104 to the pressure chamber 90; thus it is seen full system pressure is applied to the annular retrack surface 100a of the control land or second piston 100. The control pressure for the head of the first piston 98 of the actuating chamber 92 is delivered from the respective ones of the actuator ports 16 of the servo valve 18. In the schematic of FIG. 2, the several circumferentially arranged valve ports 114 of the encoder 12 have been given individual numbers such as 1', 2', 3', 5', etc. It will be seen that each of these encoder valve ports 114 is connected by a separate fluid line 40 to a single one of the several closely spaced actuator ports 16 of the circuit seeking servo valve 18. As explained above in the section discussing the encoder, the elongated fluid slots 142 and 144 of the rotor 134 are connected through the passage 146 to the actuating chamber 92 of the circuit seeking servo 18.

In operation, a signal is applied to the three-phase stepping motor 10 which motor as described before moves in 15° steps and is geared down to 2:1 to drive the hydraulic encoder 12 either clockwise or counterclockwise, placing one of the fluid slots 142 or 144 of the rotor 134 in alignment with one of the several circumferentially arranged radial ports 114, say, port 5', which means that the fluid slot 142 moves into alignment with the radial port 5' and thus opens the pressure chamber 90 through an actuator port 16 (designated 5" in FIG. 2) and fluid lines 40 (designated 5''') to the rotary valve port 5', resulting in control pressure being supplied through the fluid supply port 106 to the actuating chamber 92. The pressure supplied to the actuating chamber 92 moves the control member 50 to the right of FIG. 1 until the actuator control land or piston 100 reaches the selected port, namely, in this instance, the actuator port 5". The actuator control land 100 then closes off the pressure and once again no pressurized fluid is being delivered to the rotary valve and through it to the actuating chamber 92 of the circuit seeking servo. It will be noted in the drawings that the edges of the control land align with the edges of the actuator port. By making the actuator ports 16 and the control land 100 the same length and providing sharp edges, a very steep rate of change of pressure is assured which will position the actuator rod 20 within .0002 to .0005 of an inch. The area of the actuator ports 16 determines the peak velocity and their length controls the deceleration at the end of the stroke. In some applications, it is desirable that the control land 100 cover two actuator ports 16 in order to give a deceleration distance twice that provided with a single actuator port. In such latter application, it is desirable that the two slots 142 and 144 of the rotary valve be 180° diametrically opposed for optimum hydraulic balance. It will be noted that in the particular embodiment illustrated in the drawings, the slots 142 and 144 are very close to being 180° apart which, of course, is desirable from a hydraulic balance standpoint.

In the schematic representation of FIG. 2, the control member 50 is shown in its fully retracted position and in the preceding paragraph there has been described a partial extension of the control land to bring it into alignment with the actuator port 5". It will now be assumed that the stepper motor 10 has been provided with a signal which causes the rotor 134 of the encoder 12 to move its fluid slot 144 into alignment with the radial valve port 2'. It will be remembered that at this point in time or immediately preceding, the control land 100 is covering the actuator port 5" which is to the right of actuator port 2" which is the actuator port most recently selected by the hydraulic encoder. This being so, the actuator port 2" of the circuit seeking servo opens into the exhaust chamber 94 lying between the control land 100 and the piston 98 of the control member 50. It will thus be seen that with movement of the fluid slot 144 into alignment with the radial valve port 2' of the hydraulic encoder 12 there is an open passage for movement of fluid from the actuating chamber 92 via line 146 through the encoder, line 40 (more exactly speaking, line 2''') and through the open actuator port 2" into the exhaust chamber 94. The exhaust chamber 94 of the circuit seeking servo is connected via exhaust port 108 to a hydraulic fluid reservoir. The full system pressure applied to the annular face 100a of the control land 100 will, with aligning of fluid slot 144 of the rotor with the rotor valve port 2', cause the control member 50 and its actuator rod 20 to move to the left of FIG. 2 towards actuator port 2". When the actuator control land 100 reaches the selected port, here actuator port 2″, it closes off the exhaust chamber 94 of the circuit seeking servo to the rotary valve or encoder 12 and the servo 18 has once again reached equilibrium and will remain so until the hydraulic encoder 12 in response to movement by the stepper motor 10 moves one of the fluid passages 142 and 144 of the rotor into alignment with another one of the radial ports 114 of the encoder.

Although exemplary embodiments of the invention have been disclosed herein for purposes of illustration, it will be understood that various changes, modifications and substitutions may be incorporated in such embodiments without departing from the spirit of the invention as defined by the claims which follow.

I claim:

1. A fluid actuated servo valve comprising:
   a valve body having a row of closely spaced ports at one end of the body;
   a movable control member within said valve body and including an actuating rod member projecting through an end of the valve body and having spaced pistons, a first one of said pistons being disposed at one end of the rod within the valve body and a second piston being located on the rod away from the first piston and movable along a substantial length of the row of closely spaced ports;
   an exhaust port located in the valve body between the two pistons throughout the length of travel of said two pistons;
   a pressure port located in the valve body between the row of closely spaced ports and said one end of the valve body; and
   a hydraulic supply port located in the valve body between the first piston and the other end of said valve body.

2. A fluid actuated servo valve comprising:
   a valve body having a row of closely spaced ports at one end of the body;
   a movable control member within said valve body and including an actuating rod member projecting through said end of the body and having spaced pistons, a first one of said pistons being disposed at one end of the rod within the valve body and a second piston being located on the rod away from the first piston and movable along a substantial length of the row of closely spaced ports, said second piston acting as actuator control land for the opening and closing of the several ports;
   an exhaust port located in the valve body and disposed between the two pistons throughout the length of the travel of said two pistons;
   a pressure port located in the valve body between the row of closely spaced ports and said one end of the valve body; and
   a hydraulic supply port located in the valve body between the first piston and the other end of said valve body.

3. A fluid actuated servo valve in accordance with claim 2 wherein the control land second piston is sized to cover a single one of the closely spaced ports of the row of said ports.

4. A fluid actuated servo valve comprising:
   a valve body including a row of closely spaced ports opening through the wall of the valve body into the interior thereof;
   a movable control member including an actuating rod projecting through an end of the valve body, said control member dividing the interior of the valve body into a pressure section of a variable length, an actuating section of a variable length, and an exhaust section disposed therebetween, said control member having an actuating control land providing a barrier between the exhaust and pressure sections and movable along the length of the row of closely spaced ports, and a second barrier separating the actuating section from the exhaust section, said control land serving to expose various ones of the closely spaced ports to the respective pressure section and the exhaust section;
   an exhaust port located in the valve body and opening into the exhaust section thereof;
   a pressure port located in the valve body and opening into the pressure section thereof; and
   a fluid supply port located in the valve body and opening into the actuating section thereof.

5. A valve actuator servo valve comprising:
   a valve body including a row of closely spaced ports opening through the wall of the valve body into the interior thereof;
   a movable control member including an actuating rod projecting through an end of the valve body, said control member dividing the interior of the valve body into a pressure section of a variable length at one end thereof, an actuating section of a variable length at the other end thereof, and an exhaust section of a fixed length disposed therebetween, said control member having an actuating control land on the actuating rod, providing a first barrier between the exhaust and pressure sections and movable along the length of the row of closely spaced ports, and a second barrier spaced from said first barrier on the rod separating the actuating section from the exhaust section, said control land serving to expose various ones of the closely spaced ports to the respective pressure section and the exhaust section;
   an exhaust port located in the valve body and opening into the exhaust section thereof;
   a pressure port located in the valve body and opening into the pressure section thereof; and
   a fluid supply port located in the valve body and opening into the actuating section thereof.

6. A fluid actuated servo valve in accordance with claim 5 wherein the control land is sized to cover a single one of said closely spaced ports.

7. A hydraulic control system comprising:
   a valve body having a row of closely spaced ports at one end of the body;
   a movable control member within said valve body and including an actuating rod member projecting beyond an end of the valve body and having spaced pistons with a first one of said pistons being disposed at one end of the rod within the valve body and a second piston located on the rod away from the first piston and movable along a substantial length of the row of closely spaced ports;
   an exhaust port located in the valve body and disposed between the two pistons throughout the length of travel of said two pistons;
   a pressure port located in the valve body between the row of closely spaced ports and said one end of the valve body;
   a hydraulic supply port located in the valve body between the first piston and the other end of said valve body; and
   means for selectively connecting one of the closely spaced ports of said row to the hydraulic supply port located in the valve body between the first piston and said other end of the valve body.

8. A hydraulic control system comprising:
   a valve body including a row of closely spaced ports opening through the wall of the valve body into the interior thereof;
   a movable control member including an actuating rod projecting through an end of the valve body, said control member dividing the interior of the valve body into a pressure section of a variable length, an actuating section of a variable length, and an exhaust section disposed therebetween, said control member having an actuating control land, providing a barrier between the exhaust and pressure section and movable along the length of the row of closely spaced ports, and a second barrier separating the actuating section from the exhaust section, said control land serving to expose various ones of the closely spaced ports to the respective pressure section and the exhaust section;

an exhaust port located in the valve body and opening into the exhaust section thereof;

a pressure port located in the valve body and opening into the pressure section thereof;

a fluid supply port located in the valve body and opening into the actuating section thereof; and means for selectively connecting one of the closely spaced ports of said row to the fluid supply port of the valve body.

9. A hydraulic control system comprising:

a servo valve body having a row of closely spaced ports at one end of the body;

a movable control member within said valve body and including an actuating rod member projecting through an end of the valve body and having spaced pistons, a first one of said pistons being disposed at one end of the rod and a second piston being located on the rod away from the first piston and movable along a substantial length of the row of closely spaced ports;

an exhaust port located in the valve body and disposed between said two pistons throughout the length of travel of said two pistons;

a pressure port located in the valve body between the row of closely spaced ports and said one end of the valve body;

a hydraulic supply port located in the valve body between the first piston and the other end of said valve body; and means for selectively connecting one of the closely spaced ports of said row to the hydraulic supply port of the valve body, said selective means including a selector valve having a plurality of ports connected by a plurality of lines to the respective closely spaced ports of the valve body, a fluid passage within the selector valve that may be selectively connected to various ones of said plurality of valve ports of the selector valve, and a fluid line communicating with the fluid passage of the selector valve and connecting with the hydraulic supply port of the valve body.

10. In a hydraulic control system:

a servo valve body including a row of closely spaced ports opening through the wall of the valve body into the interior thereof;

a movable control member including an actuating rod projecting through an end of the valve body, said control member dividing the interior of the valve body into a pressure section of a variable length, an actuating section of a variable length, and an exhaust section disposed therebetween, said control member having an actuating control land providing a barrier between the exhaust and pressure sections and movable along the length of the row of closely spaced ports and a second barrier separating the actuating section from the exhaust section, said control land serving to expose various ones of the closely spaced ports to the respective pressure and exhaust sections;

an exhaust port located in the valve body and opening into the exhaust section thereof;

a pressure port located in the valve body and opening into the pressure section thereof;

a fluid supply port located in the valve body and opening into the actuating section thereof; and means for selectively connecting one of the closely spaced ports of said row of the valve body to the fluid supply port of said valve body, said selective means including a selector valve having a plurality of ports connected by a plurality of lines to the respective closely spaced ports of the valve body, a fluid passage within the selector valve that may be selectively connected to various ones of said plurality of selector valve ports, and a fluid line communicating with the fluid passage of said selector valve body and connecting to the fluid supply port of the valve body.

11. A hydraulic system for providing digital mechanical positioning, said system comprising:

a servo valve body having a row of closely spaced ports at one end of the body;

a movable control member within said valve body and including an actuating rod member projecting through an end of the valve body and having spaced pistons, a first one of said pistons being disposed at one end of the rod and a second piston being located on the rod away from the first piston and movable along a substantial length of the row of closely spaced ports;

an exhaust port located in the valve body and disposed between the two pistons throughout the length of travel of said two pistons;

a pressure port located in the valve body between the row of closely spaced ports and said one end of the valve body;

a hydraulic supply port located in the valve body between the first piston and the other end of said valve body;

means for selectively connecting one of the closely spaced ports of said valve body to the hydraulic supply port thereof, said selective means including a rotary valve having a stator member having a plurality of circumferentially arranged ports connected by a plurality of fluid passage means to the respective closely spaced ports of the valve body, an outlet passage located in the stator member, a rotor member having a fluid passage therein, said rotor member being rotatable in both clockwise and counterclockwise directions for connecting various ones of the rotary valve ports through the passage of said rotor to the outlet passage of the stator member, and means connecting the stator outlet passage to the hydraulic supply port of the valve body; and an incremental stepping device connected to the rotary valve for movement of its rotor in response to signals supplied to said incremental stepping device, said incremental stepping device being capable of driving the rotor of the rotary valve in both clockwise and counterclockwise directions.

12. A system in accordance with claim 11 wherein the incremental stepping device comprises an electrical stepping motor.

13. A hydraulic system to provide digital mechanical positioning, said system comprising:

a servo valve body including a row of closely spaced ports opening through the wall of the valve body into the interior thereof;

a movable control member including an actuating rod projecting through an end of the valve body, said control member dividing the interior of the valve body into a pressure section of a variable length, an actuating section of a variable length, and an exhaust section disposed therebetween of fixed length, said control member having an actuating control land providing a first barrier between the exhaust and pressure sections and movable along the length of the row of the closely spaced ports and a second barrier separating the actuating section from the exhaust section, said control land serving to expose various ones of the closely spaced ports to the respective pressure and exhaust sections;

an exhaust port located in the valve body and opening into the exhaust section thereof;

a pressure port located in the valve body and opening into the pressure section thereof;

a fluid supply port located in the valve body and opening into the actuating section thereof; and means for selectively connecting one of the closely spaced ports of said valve body to the fluid supply port thereof, said selective means including a rotary valve having a stator member having a plurality of circumferentially arranged ports connected by a plurality of fluid passage means to the respective closely spaced ports of the valve body, an outlet passage located in the stator member, a rotor member having a fluid passage therein, said rotor member being rotatable in both clockwise and counterclockwise directions for connecting various ones of the rotary valve ports through the passage of said rotor to the outlet passage of the stator member, and means connecting the stator outlet passage to the fluid supply port of the valve body; and an incremental stepping device connected to the rotary valve for movement of its rotor in response to signals supplied to said incremental stepping device, said incremental stepping device being capable of driving the rotor of the rotary valve in both clockwise and counterclockwise directions.

14. A system in accordance with claim 13 wherein the incremental stepping device comprises an electrical stepping motor.

References Cited by the Examiner
UNITED STATES PATENTS

| | | | |
|---|---|---|---|
| 1,326,228 | 12/1919 | Turner | 91—402 |
| 2,917,027 | 12/1959 | Hayse | 137—625.24 |
| 3,031,869 | 2/1962 | Ross | 137—625.24 |
| 3,103,853 | 9/1963 | Hussey | 91—48 |
| 3,110,228 | 11/1963 | Shramo | 91—48 |
| 3,174,406 | 3/1965 | Hague | 91—48 X |

SAMUEL LEVINE, *Primary Examiner.*